United States Patent [19]

Otaki

[11] Patent Number: 5,764,408
[45] Date of Patent: Jun. 9, 1998

[54] LENS-BARREL OPTICAL SYSTEM AND MICROSCOPE APPARATUS

[75] Inventor: Tatsuro Otaki, Tokyo, Japan

[73] Assignee: Nikon Corporation, Tokyo, Japan

[21] Appl. No.: 628,762

[22] Filed: Apr. 5, 1996

[30] Foreign Application Priority Data

Apr. 6, 1995 [JP] Japan ................. 7-106963

[51] Int. Cl.$^6$ ................. G02B 21/00; G02B 21/06; G02B 5/04
[52] U.S. Cl. ................. 359/368; 359/381; 359/385; 359/834
[58] Field of Search ................. 359/363, 368, 359/374, 377, 376, 381, 384, 385, 831, 836, 837, 834; 348/79

[56] References Cited

U.S. PATENT DOCUMENTS

| | | | |
|---|---|---|---|
| 4,299,439 | 11/1981 | Strömblad | 359/384 |
| 4,597,644 | 7/1986 | Schindl | 359/363 |
| 4,643,541 | 2/1987 | Matsubara | 359/384 |
| 4,720,178 | 1/1988 | Nishioka et al. | 359/836 |
| 5,227,914 | 7/1993 | Hanzawa et al. | 359/377 |

FOREIGN PATENT DOCUMENTS 4-124218  4/1992  Japan.

Primary Examiner—Paul M. Dzierzynski
Assistant Examiner—Mark A. Robinson
Attorney, Agent, or Firm—Foley & Lardner

[57] ABSTRACT

A lens-barrel optical system of the present invention is a lens-barrel optical system for guiding a beam emerging from an objective optical system in a focused state to an eyepiece optical system, which includes (i) a deflecting prism having three internal reflecting surfaces arranged in a triangular prism, the deflecting prism successively reflecting a beam incident in a first direction parallel to the optical axis of the objective optical system by the three reflecting surfaces to let the beam travel in a substantially M-shaped optical path, thereby letting the beam emerge in a second direction opposite to the first direction; and (ii) a reflector for reflecting the beam emerging from the deflecting prism to guide the beam to the eyepiece optical system. The inventor found out the way of naturally setting the eyepiece optical system at a low level without using an imaging lens and with decreasing the number of reflections in order to avoid flare and deterioration of optical image and also in order to avoid an increase of the size of the apparatus itself. Therefore, the observer's eye level can be set at a freely low position.

20 Claims, 7 Drawing Sheets

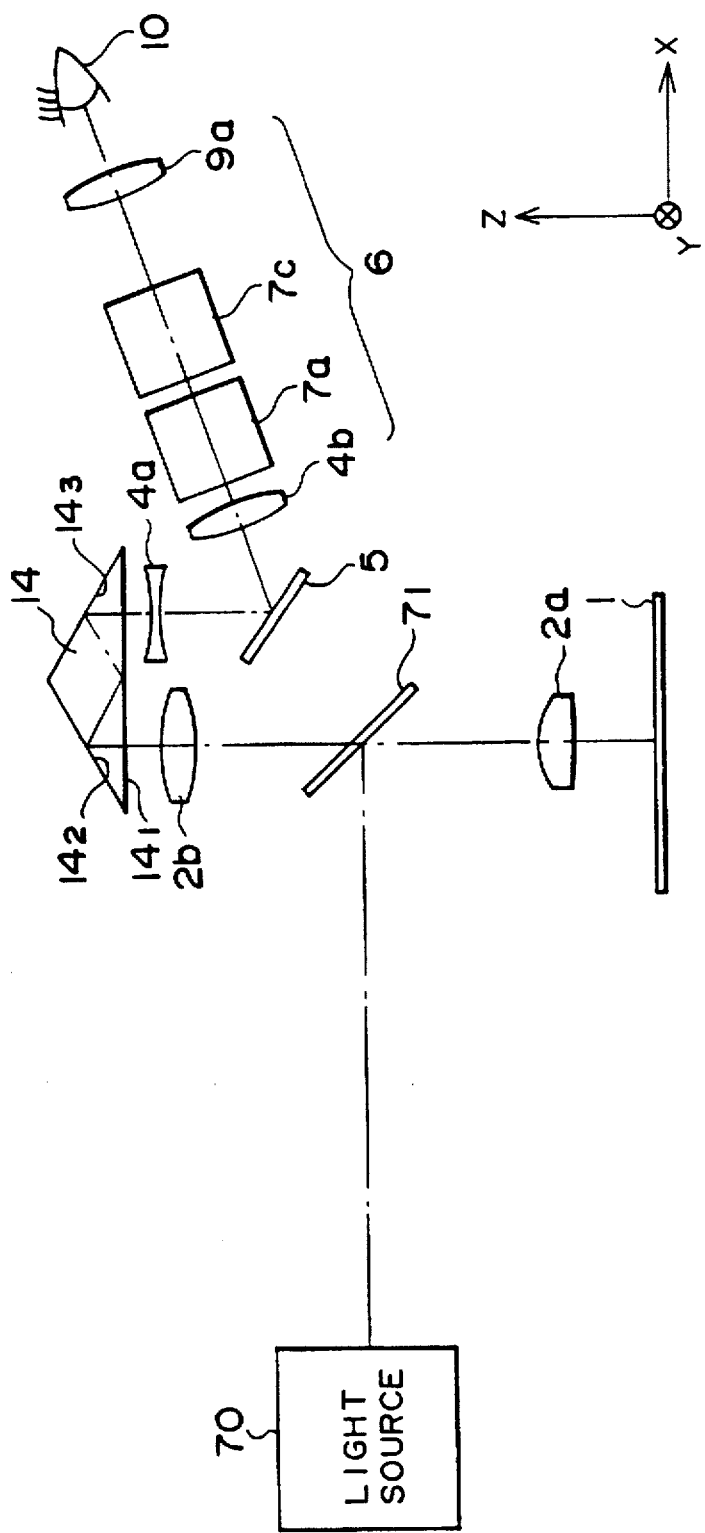

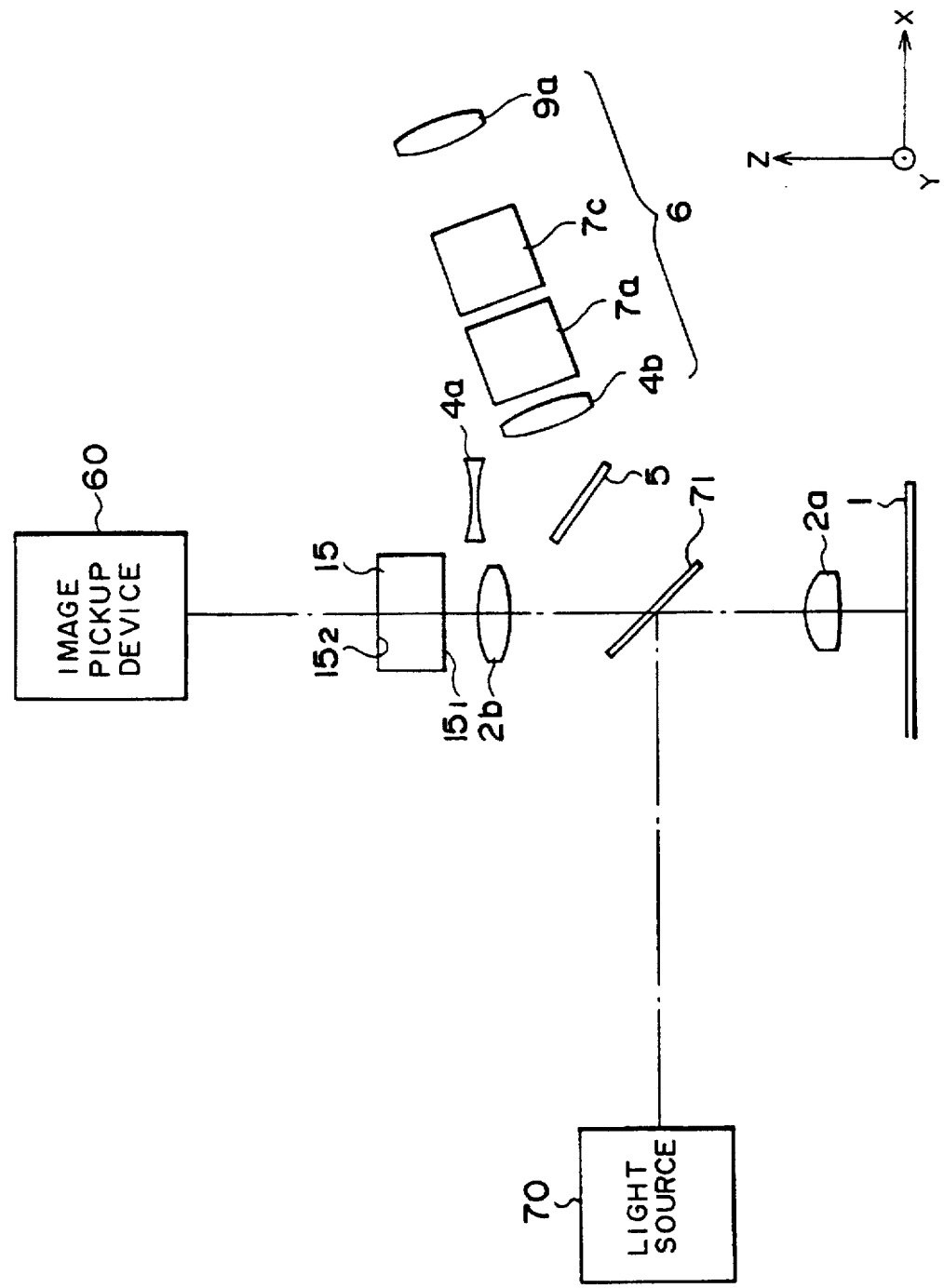

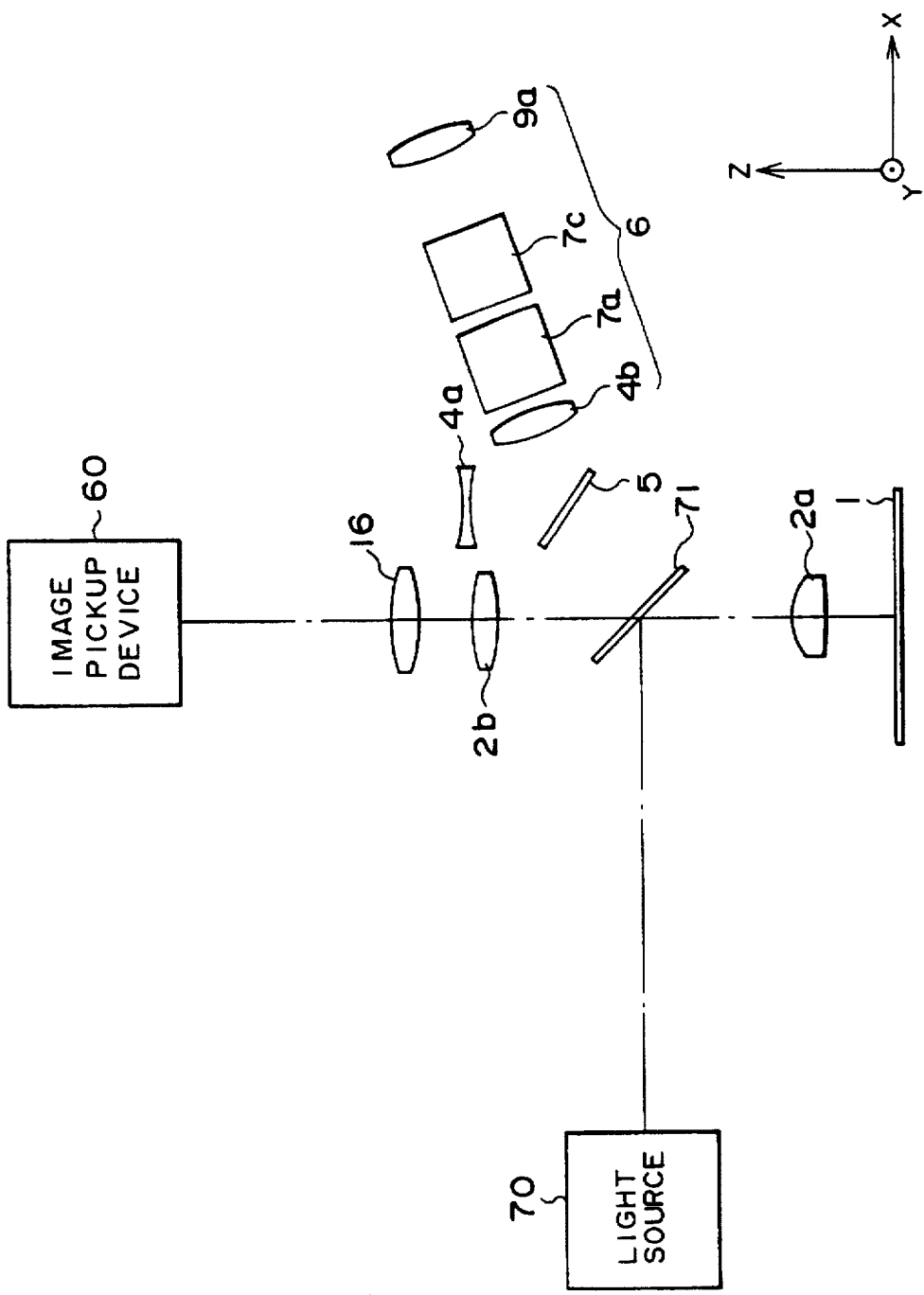

5,764,408

1

LENS-BARREL OPTICAL SYSTEM AND MICROSCOPE APPARATUS

BACKGROUND OF THE INVENTION

1. Field of the Invention

The present invention relates to a lens-barrel optical system applied to observation of microscopic structures or optical characteristics of various objects in an enlarged state, and a microscope apparatus provided with the same lens-barrel optical system so as to observe a microscopical image projected thereby.

2. Related Background Art

An example of the lens-barrel optical system conventionally used in microscopes or the like is the one as disclosed in Japanese Laid-open Utility Model Application No. 4-124218. In order to relay an image formed by an imaging lens, this lens-barrel optical system is arranged to reflect the axis of incident light perpendicularly into a first reflection light axis by a first prism, to bend the first reflection light axis perpendicularly twice into a second reflection light axis parallel to but opposite to the first reflection light axis by a second prism, and to reflect the second reflection light axis perpendicularly into the axis of emergent light by a third prism.

Further, a first gear member fixed to a first prism makes the first prism rotatable about the first reflection light axis, and a second gear member, fixed to a third prism, meshing with the first gear member and having the same diameter as the first gear member does, makes the third prism rotatable about the second reflection light axis. Here, when the incident light axis and emergent light axis are parallel to each other and are directed in the same direction, the incident light axis, the exit light axis, the first reflection light axis, and the second reflection light axis are positioned on a same plane. The imaging lens is placed behind the first prism. Thus, there is such an advantage that the apparatus can be formed in a simple arrangement, because the optical path can be short.

Another example of the lens-barrel optical system conventionally used in the microscopes or the like is the one as disclosed in U.S. Pat. No. 4,299,439. In order to displace a lens barrel of eyepiece in the heightwise direction, the lens-barrel optical system is provided with a lens barrel portion of a swing arm mechanism between a lens barrel portion of objective lens and a lens barrel portion of eyepiece lens.

In the lens barrel portion of the swing arm mechanism, a beam incident from the objective is reflected by a first prism and thereafter is reflected by a first mirror rotatable about the swing axis to form an intermediate image. A beam emerging from the intermediate image is condensed by a first lens group, is reflected by a second reflecting mirror, thereafter is converged by a second lens group, and then is reflected by a second prism. This system has such an advantage that the eyepiece can be set at a relatively low position without shortening the optical path.

SUMMARY OF THE INVENTION

An object of the present invention is to provide a lens-barrel optical system that permits the eye level of an observer to be set at a low position without flare and deterioration of optical image. Another object of the present invention is to provide a lens-barrel optical system that permits the observer's eye level to be variably set without increasing the size of the apparatus itself. Another object of

2 the present invention is to provide a lens-barrel optical system that permits an optical image of a measured object to be projected in a plurality of different directions.

A further object of the present invention is to provide a microscope apparatus equipped with such a lens-barrel optical system, which permits the observer to readily observe the optical image of the measured object. Another object of the present invention is a microscope apparatus provided with such a lens-barrel optical system, which permits selective observation of either naked eye observation or image pickup observation or simultaneous observation of naked eye observation and image pickup observation for the optical image of the measured object.

In order to achieve the above objects, the lens-barrel optical system of the present invention is for guiding a beam emitted from an objective optical system to an eyepiece optical system as focusing the beam, comprising: (i) a deflecting prism having three internal reflecting surfaces arranged in a triangular prism, the deflecting prism successively reflecting a beam incident in a first direction parallel to an optical axis of the objective optical system by the three reflecting surfaces to let the beam travel in a substantially M-shaped optical path, thereby letting the beam emerge in a second direction opposite to the first direction; and (ii) a reflector for reflecting the beam emerging from the deflecting prism to guide the beam to the eyepiece optical system.

In the lens-barrel optical system as described, the beam emerging from the objective optical system is reflected by the deflecting prism to be deflected into an emergent direction opposite to an incident direction and thereafter is reflected by the reflector to be guided to the eyepiece optical system. Namely, inside the deflecting prism, while the beam incident from the objective optical system is reflected three times, it is deflected only once upward relative to the horizontal direction as to the observer and deflected downward relative to the horizontal direction as to the observer by the other two reflections.

The inventor found out the way of naturally setting the eyepiece optical system at a low level without using an imaging lens and with decreasing a number of reflections in order to avoid flare and deterioration of optical image and in order to avoid an increase of the size of the apparatus itself. Therefore, the observer's eye level can be set at a freely low position. Further, even if an intermediate lens barrel or the like is positioned between the lens-barrel optical system and a sample of the measured object, the observer's eye level can be set at a relatively low position.

In this case, the deflecting prism may be comprised of a branching prism having a semitransparent surface of the reflecting surface for first reflecting the beam incident from the objective optical system out of the three reflecting surfaces, the branching prism letting the beam incident in a first direction travel through the semitransparent surface, thereby letting the beam emerge still in the first direction, and, on the other hand, reflecting the beam by the semitransparent surface and successively reflecting the beam by the other two reflecting surfaces so as to let the beam travel in the substantially M-shaped optical path, thereby letting the beam emerge in the second direction to guide the beam to the reflector.

In the lens-barrel optical system as described, the beam emerging from the objective optical system is branched by the branching prism into the optical paths in the first direction along the optical axis of the objective optical system and in the second direction parallel to the optical axis of the objective optical system but opposite to the first direction. Namely, the branching prism splits the beam incident from the objective optical system into the light transmitted still in the first direction by the semitransparent surface and the light reflected and deflected by the semitransparent surface. Since there is no optical interfering member positioned in a traveling direction of the beam emerging from the semitransparent surface of the branching prism. optical images of the measured object are simultaneously projected in a plurality of different directions.

A preferred embodiment of the lens-barrel optical system further comprises a swing arm mechanism for variably setting an angle of depression in a direction of an optical axis of the eyepiece optical system and an angle of depression in a direction of a surface of the reflector in correspondence to each other. In this lens-barrel optical system, the observer's eye level can be variably set by freely changing the angle of depression of the eyepiece optical system.

Another preferred embodiment of the lens-barrel optical system further comprises a changeover mechanism for detachably setting the deflecting prism relative to an optical path along the first direction. In this lens-barrel optical system, the beam emerging from the objective optical system changes its optical path either into the first direction along the optical axis of the objective optical system or into the second direction parallel to the optical axis of the objective optical system but opposite to the first direction in accordance with mounting or dismounting of the deflecting prism in the optical path along the first direction. Thus, an optical image of the measured object may be selectively projected in one of plural different directions.

A desired embodiment of the lens-barrel optical system further comprises a branching prism arranged as interchangeable with the deflecting prism by the changeover mechanism, wherein, when moved into the optical path along the first direction, the branching prism has three internal surfaces consisting of a semitransparent surface and two reflecting surfaces arranged in a triangular prism, for letting the beam incident in the first direction travel through the semitransparent surface, thereby letting the beam emerge still in the first direction and, on the other hand, reflecting the beam by the semitransparent surface and thereafter successively reflecting the beam by the two reflecting surfaces so as to let the beam travel in the substantially M-shaped optical path, thereby letting the beam emerge in the second direction to guide the beam to the reflector.

Another desired embodiment of the lens-barrel optical system further comprises a plane-parallel optical element arranged as interchangeable with the deflecting prism by the changeover mechanism, wherein, when moved into the optical path along the first direction, the plane-parallel optical element has two transparent surfaces set in parallel with each other, for letting the beam incident in the first direction successively travel through the two transparent surfaces, thereby letting the beam emerge still in the first direction.

A further desired embodiment of the lens-barrel optical system further comprises a relay lens arranged as interchangeable with the deflecting prism by the changeover mechanism, wherein, when moved into the optical path along the first direction, the relay lens has at least one lens surface, for refracting the beam incident in the first direction by the at least one refracting surface, thereby letting the beam emerge still in the first direction.

Next, in order to achieve the above objects, the microscope apparatus of the present invention, for enlarging and projecting an optical image of a measured object in an observable size, comprises: (a) a stage for holding the measured object; (b) an illumination optical system for emitting illumination light to the measured object; and (c) a lens-barrel optical system for condensing and projecting measuring light emerging from the measured object, wherein the lens-barrel optical system comprises: (i) an objective optical system for condensing the measured light emerging from the measured object to form an optical image of the measured object, (ii) a deflecting prism having three internal reflecting surfaces arranged in a triangular prism, the deflecting prism successively reflecting the measuring light incident in a first direction parallel to an optical axis of the objective optical system by the three reflecting surfaces so as to let the beam travel in a substantially M-shaped optical path, thereby letting the beam emerge from a second direction opposite to the first direction, (iii) a reflector for reflection-deflecting the measuring light emerging from the deflecting prism, and (iv) an eyepiece optical system for enlarging the image of the measuring light emerging from the reflector into an optical image of the measured object in an observable size.

In the lens-barrel optical system of the microscope apparatus as described above, the beam emerging from the objective optical system is reflected by the deflecting prism to be deflected into the emergent direction opposite to the incident direction and thereafter is reflected by the reflector to be guided to the eyepiece optical system. Namely, inside the deflecting prism, while the beam incident from the objective optical system is reflected three times, the beam is deflected only once upward relative to the horizontal direction as to the observer and is deflected downward relative to the horizontal direction as to the observer by the other two reflections.

The inventor found out the way of naturally setting the eyepiece optical system at a low position without using an imaging lens and with decreasing the number of reflections in order to avoid occurrence of flare and deterioration of optical image and in order to avoid an increase of the size of apparatus itself. Therefore, the observer's eye level can be set at a freely low position. Further, even if an intermediate lens barrel or the like is positioned between the lens-barrel optical system and the sample of the measured object, the observer's eye level can be set at a relatively low position. Therefore, the observer can readily observe the optical image of the measured object.

Here, a preferred embodiment of the microscope apparatus is arranged in such a manner that the illumination optical system is comprised of a light source for generating the illumination light, and an optical branching filter for guiding the illumination light emitted from the light source to the objective optical system and guiding the measuring light emerging from the objective optical system to the deflecting prism. In a preferred embodiment, the lens-barrel optical system further comprises a binocular separating prism for separating the measuring light emerging from the reflector into two beams parallel to each other and guiding the beams to the eyepiece optical system. A preferred embodiment of the microscope apparatus further comprises a drive mechanism for three-dimensionally adjusting a relative positional relation between the stage and the lens-barrel optical system.

In this case, the deflecting prism may be preferably comprised of a branching prism having a semitransparent surface of the reflecting surface for first reflecting the beam incident from the objective optical system out of the three reflecting surfaces, the branching prism letting the beam incident in a first direction travel through the semitransparent surface, thereby letting the beam emerge still in the first direction, and, on the other hand, reflecting the beam by the semitransparent surface and successively reflecting the beam by the other two reflecting surfaces so as to let the beam travel in the substantially M-shaped optical path, thereby letting the beam emerge in the second direction to guide the beam to the reflector. A desired microscope apparatus further comprises an image pickup device for condensing the measuring light emerging in the first direction from the lens-barrel optical system to pick up the measuring light condensed.

In the lens-barrel optical system of such a microscope apparatus, the beam emerging from the objective optical system is branched by the branching prism into the optical paths in the first direction along the optical axis of the objective optical system and in the second direction parallel to the optical axis of the objective optical system but opposite to the first direction. Namely, the branching prism splits the beam incident from the objective optical system into the light transmitted still in the first direction by the semitransparent surface and the light reflected and deflected by the semitransparent surface.

Since there is no optical interfering member positioned in a traveling direction of the beam emerging from the semitransparent surface of the branching prism, optical images of the measured object are simultaneously projected in a plurality of different directions. Therefore, the apparatus permits simultaneous observation of optical images of the measured object in the naked eye observation utilizing the reflected light of the branching prism and in the image pickup observation utilizing the transmitted light of the branching prism.

In a preferred embodiment, the lens-barrel optical system further comprises a swing arm mechanism for variably setting an angle of depression in a direction of an optical axis of the eyepiece optical system and an angle of depression in a direction of a surface of the reflector in correspondence to each other. In the lens-barrel optical system of this microscope apparatus, the observer's eye level can be variably set by freely changing the angle of depression of the eyepiece optical system.

In a preferred embodiment, the lens-barrel optical system further comprises a changeover mechanism for detachably setting the deflecting prism relative to the optical path along the first direction. A desired microscope apparatus further comprises an image pickup device for condensing the measuring light emerging in the first direction from the lens-barrel optical system to pick up the measuring light condensed. In a desired embodiment, the image pickup device is either a photographic camera for taking the optical image of the measured object as a still image or a video camera for taking the optical image of the measured object as a moving picture.

In this lens-barrel optical system of the microscope apparatus, the beam emerging from the objective optical system changes its optical path either into the first direction along the optical axis of the objective optical system or into the second direction parallel to the optical axis of the objective optical system but opposite to the first direction in accordance with mounting or dismounting of the deflecting prism into the optical path along the first direction. Thus, an optical image of the measured object is selectively projected in one of a plurality of different directions. Accordingly, the apparatus permits selective observation for the optical image of the measured object in the naked eye observation utilizing the reflected light of the deflecting prism or in the image pickup observation utilizing straight traveling light not passing the deflecting prism.

In a more desired embodiment, the lens-barrel optical system further comprises a branching prism arranged as interchangeable with the deflecting prism by the changeover mechanism, wherein, when moved into the optical path along the first direction, the branching prism has three internal surfaces consisting of a semitransparent surface and two reflecting surfaces arranged in a triangular prism, for letting the beam incident in the first direction travel through the semitransparent surface, thereby letting the beam emerge still in the first direction to guide the beam to the image pickup device and, on the other hand, reflecting the beam by the semitransparent surface and thereafter successively reflecting the beam by the two reflecting surfaces so as to let the beam travel in the substantially M-shaped optical path, thereby letting the beam emerge in the second direction to guide the beam to the reflector.

In a more desired embodiment, the lens-barrel optical system further comprises a plane-parallel optical element arranged as interchangeable with the deflecting prism by the changeover mechanism, wherein, when moved into the optical path along the first direction, the plane-parallel optical element has two transparent surfaces set in parallel with each other, for letting the beam incident in the first direction successively travel through the two transparent surfaces, thereby letting the beam emerge still in the first direction to guide the beam to the image pickup device.

Further, in a more desired embodiment, the lens-barrel optical system further comprises a relay lens arranged as interchangeable with the deflecting prism by the changeover mechanism, wherein, when moved into the optical path along the first direction, the relay lens has at least one lens surface, for refracting the beam incident in the first direction by the at least one refracting surface, thereby letting the beam emerge still in the first direction to guide the beam to the image pickup device.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a drawing to show optical paths when the microscope apparatus of FIG. 1 is set in a first special-purpose mode of naked eye observation;

FIG. 6 is a drawing to show optical paths when the microscope apparatus of FIG. 1 is set in a second special-purpose mode of image pickup observation; and FIG. 7 is a drawing to show optical paths when the microscope apparatus of FIG. 1 is set in a modification of the second special-purpose mode of image pickup observation.

DESCRIPTION OF THE PREFERRED EMBODIMENTS

Figure 1:
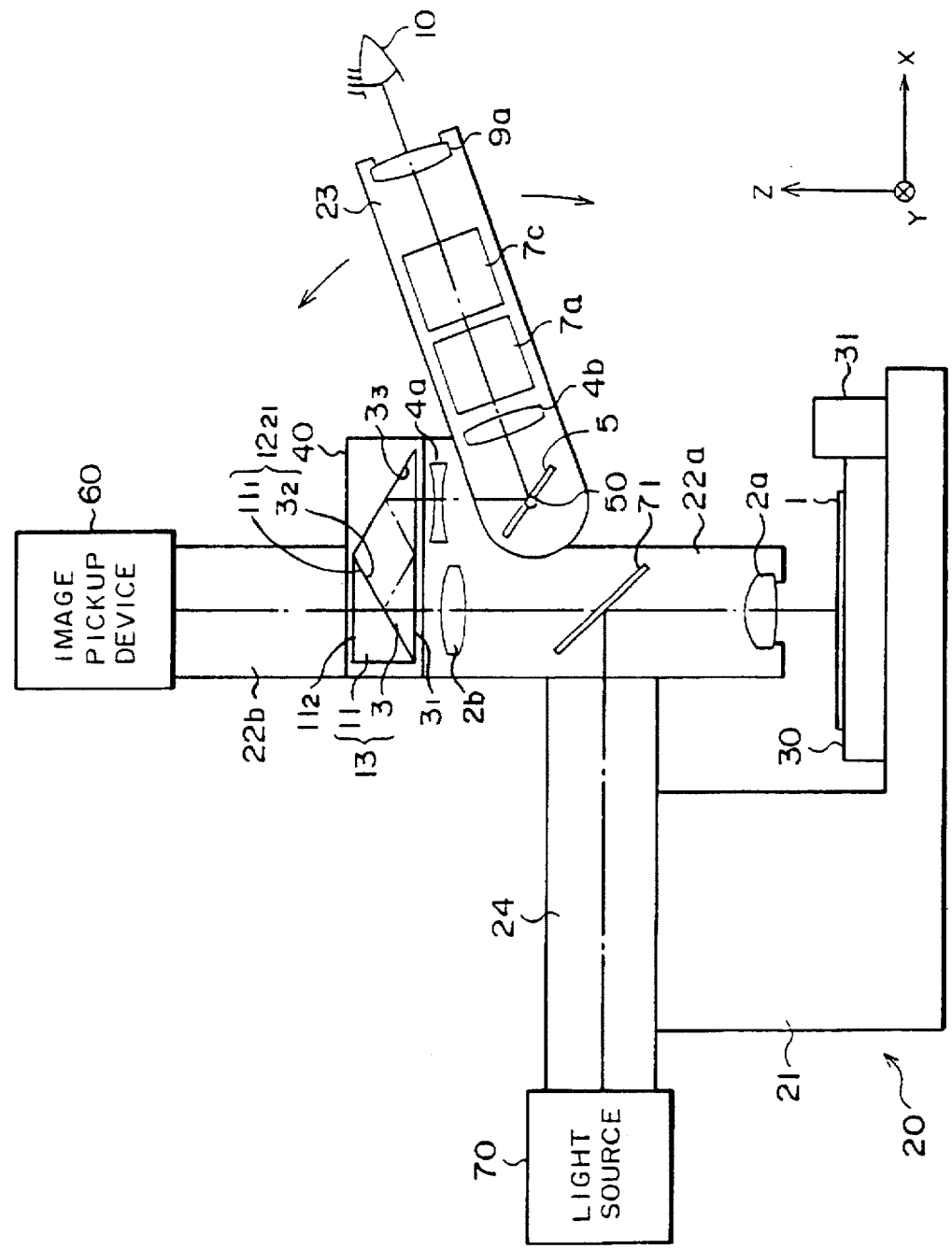
FIG. 1 is a drawing to show a schematic setup of an embodiment of the microscope apparatus according to the present invention.

The constitution and operation of an embodiment of the microscope apparatus according to the present invention will be explained in detail with reference to FIG. 1 to FIG. 7. In the description of the drawings same elements will be denoted by same reference numerals and redundant description will be omitted. It is noted that dimensional scales of the drawings do not always coincide with those in the description.

As shown in FIG. 1, the microscope apparatus 20 of the present embodiment has a stage 30 and a drive motor 31 in a lower part of support table 21 and has a first straight barrel 22a and a second straight barrel 22b above the stage 30. A changeover mechanism 40 is slidably set between the first straight barrel 22a and the second straight barrel 22b. A binocular lens barrel 23 is mounted on the upper part of the first straight barrel 22a so as to be capable of swinging through a swing arm mechanism 50. The lens-barrel optical system is formed inside each of the first straight barrel 22a, the second straight barrel 22b, the binocular lens barrel 23, an illumination barrel 24, and the changeover mechanism 40.

A sample 1 is held as a measured object on the surface of stage 30. This sample 1 is an industrial article or a living tissue. The drive motor 31 is given as a drive mechanism for adjusting a relative positional relation between the stage 30 and the first straight barrel 22a, which is arranged to move the stage 30 in three-dimensions. An image pickup device 60 is set at the top end of the second straight barrel 22b. This image pickup device 60 is a photographic camera for taking an optical image of the sample 1 as a still image or a video camera for taking an optical image of the sample 1 as a moving picture.

The first straight barrel 22a is supported by one end of the illumination barrel 24 fixed to the top part of the support table 21. A light source 70 for emitting illumination light is mounted at the other end of the illumination barrel 24. A dichroic mirror 71 is set as an optical branching filter inside the first straight barrel 22a. These light source 70 and dichroic mirror 71 are arranged as an illumination optical system for vertically illuminating the sample 1 with the illumination light.

For simplifying the following description with coordinate axes, let us define the Z-axis along the longitudinal direction of the first straight barrel 22a and second straight barrel 22b in parallel with the normal line to the surface of stage 30, the X-axis along the longitudinal direction of the illumination barrel 24 in the surface of stage 30, and the Y-axis along a direction perpendicular to these Z-axis and X-axis.

Figure 2:
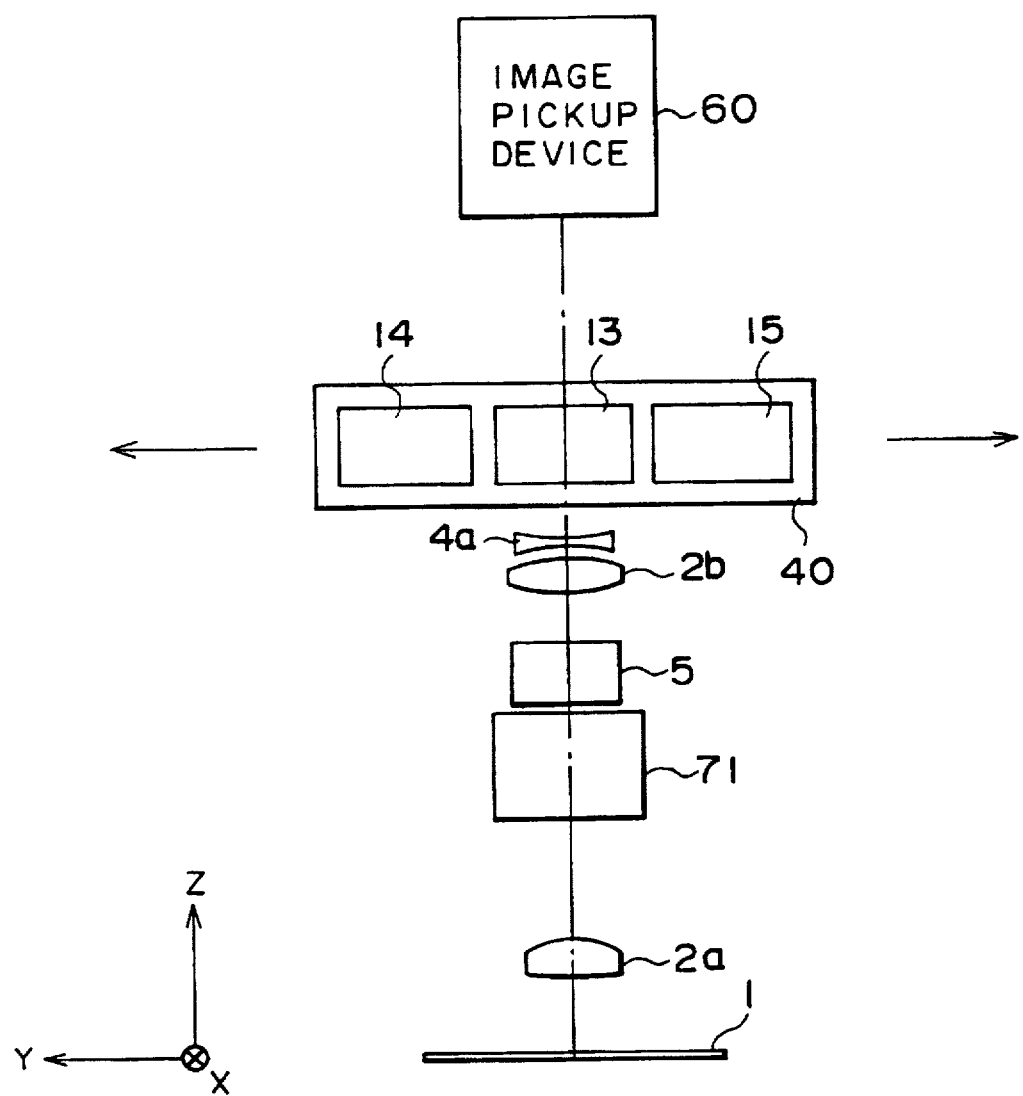
FIG. 2 is a schematic drawing to show a changeover mechanism set in the microscope apparatus of FIG. 1 in order to permit changeover among a branching prism, a deflecting prism, and a plane-parallel optical element.

As shown in FIG. 2, the changeover mechanism 40 is set slidably along the Y-axis direction between the first straight barrel 22a and the second straight barrel 22b, which enables a branching prism 13, a deflecting prism 14, and a plane-parallel optical element 15 to be mounted or dismounted relative to the optical path of the lens-barrel optical system along the Z-axis direction. Namely, this changeover mechanism 40 is arranged to effect changeover among a dual mode for permitting simultaneous naked eye observation and image pickup observation, a first special-purpose mode for only naked eye observation, and a second special-purpose mode for only image pickup observation by mounting or removing the branching prism 13, the deflecting prism 14, and the plane-parallel optical element 15 into or from the optical path of the barrel optical system.

Figure 3:
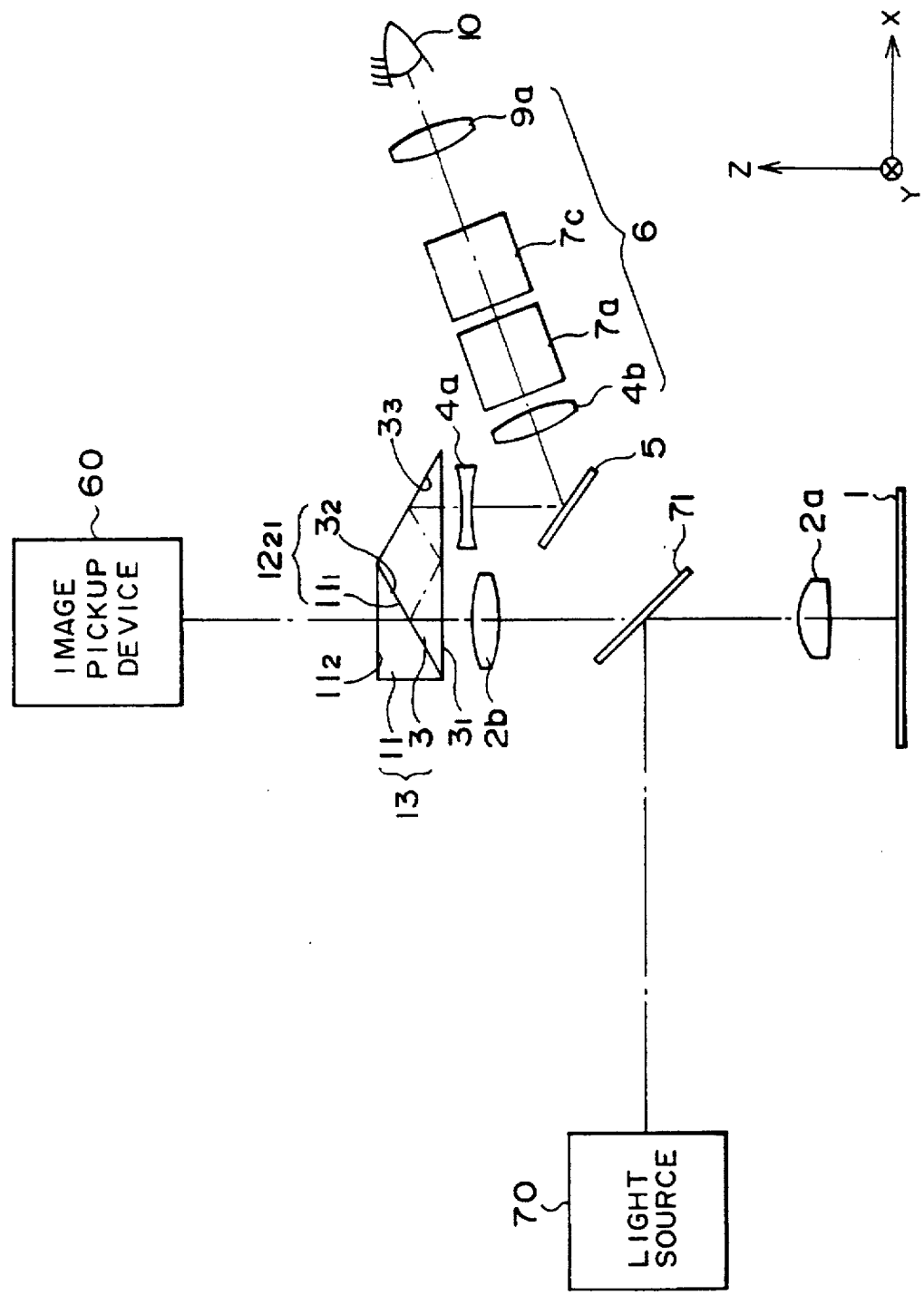
FIG. 3 is a drawing to show optical paths when the microscope apparatus of FIG. 1 is set in a dual mode of naked eye observation and image pickup observation.

As shown in FIG. 3, the branching prism 13 is mounted by the changeover mechanism 40 in the optical path of the barrel optical system between the first straight barrel 22a and the second straight barrel 22b in the dual mode for simultaneous naked eye observation and image pickup observation.

Inside the first straight barrel 22a there is an objective optical system consisting of a first objective lens 2a and a second objective lens 2b above the sample 1, and the dichroic mirror 71 is positioned between the first and second objective lenses 2a, 2b. The sample 1 is placed on the object-side focal point of the first objective 2a.

The illumination light emitted in the +X-direction from the light source 70 is reflected in the −Z-direction by the dichroic mirror 71 and thereafter is condensed by the first objective lens 2a to illuminate the sample 1 in uniform light intensity distribution. Measuring light emitted in the +Z-direction from the sample 1 thus illuminated with the illumination light is condensed by the first objective lens 2a to be infinity-corrected. Then the illumination light passes through the dichroic mirror 71 and thereafter is converged by the second objective lens 2b.

Above the second objective lens 2b, the branching prism 13 is set inside the changeover mechanism 40. The branching prism 13 is a cemented prism in which a deflecting prism 3 of a triangular prism and a transmitting prism 11 of a triangular prism are cemented to each other between their inclined planes. The deflecting prism 3 has a first plane $3_1$, a second plane $3_2$, and a third plane $3_3$, and has a cross section of a relatively flat isosceles triangle. The transmitting prism 11 has a first plane $11_1$ and a second plane $11_2$ to form a rectangular prism.

Here, a cemented surface $12_{21}$, in which the second plane $3_2$ of the deflecting prism 3 is cemented to the first plane $11_1$ of the transmitting prism 11, is formed as a half mirror. This half mirror has the reflectivity of about 20% and the transmittance of about 80%. Thus, a light beam incident to the cemented surface $12_{21}$ between the deflecting prism 3 and the transmitting prism 11 is separated into two optical paths, becoming reflected light having a light quantity of about 20% and transmitted light having a light quantity of about 80%.

An angle $\alpha_1$ between the first plane $3_1$ and the second plane $3_2$ and an angle $\alpha_2$ between the first plane $3_1$ and the third plane $3_3$ are set both to a same angle $\alpha_0$ of less than 45°. The first plane $3_1$ is set in parallel with the XY plane so as to intersect perpendicularly with the optical axis of the first and second objective lenses 2a, 2b. Therefore, the measuring light incident to the first plane $3_1$ in the +Z-direction along the optical axis of the objective optical system from the first and second objective lenses 2a, 2b is transmitted by the first plane $3_1$.

Since the second plane $3_2$ is formed as inclined at the angle of less than 45° in the XZ plane relative to the first plane $3_1$, the measuring light reflected by the second plane $3_2$ or the cemented surface $12_{21}$ is incident to the first plane $3_1$. Here, the angle $\alpha_1=\alpha_0$ between the first plane $3_1$ and the second plane $3_2$ and the refractive index n of the prism 3 for transmission and reflection are selected so as to satisfy the following formula: $\alpha_0 > (\frac{1}{2}) \cdot \sin^{-1}(1/n)$. Because of it, the measuring light totally reflected by the first plane $3_1$ becomes incident to the third plane $3_3$.

Since the third plane $3_3$ is formed as a back side reflector, all the measuring light incident to the third plane $3_3$ is reflected thereby. Since the angle $\alpha_2=\alpha_0$ between the third plane $3_3$ and the first plane $3_1$ is set to be equal to the angle $\alpha_1=\alpha_0$ between the second plane $3_2$ and the first plane $3_1$, the measuring light reflected by the third plane $3_3$ is deflected in the −Z-direction parallel to but opposite to the optical axis of the first and second objective lenses $2a$, $2b$ to be transmitted by the first plane $3_1$.

In this manner the measuring light outgoing from the first and second objective lenses $2a$, $2b$ is incident to the branching prism 3 in the +Z-direction along the optical axis of the objective optical system, then is reflected three times on the internal planes of the branching prism 3 as traveling in the approximately M-shaped optical path, and thus, is deflected in the −Z-direction parallel to the optical axis of the objective optical system but opposite to the incident direction to be emergent from the branching prism 3.

Figure 4:
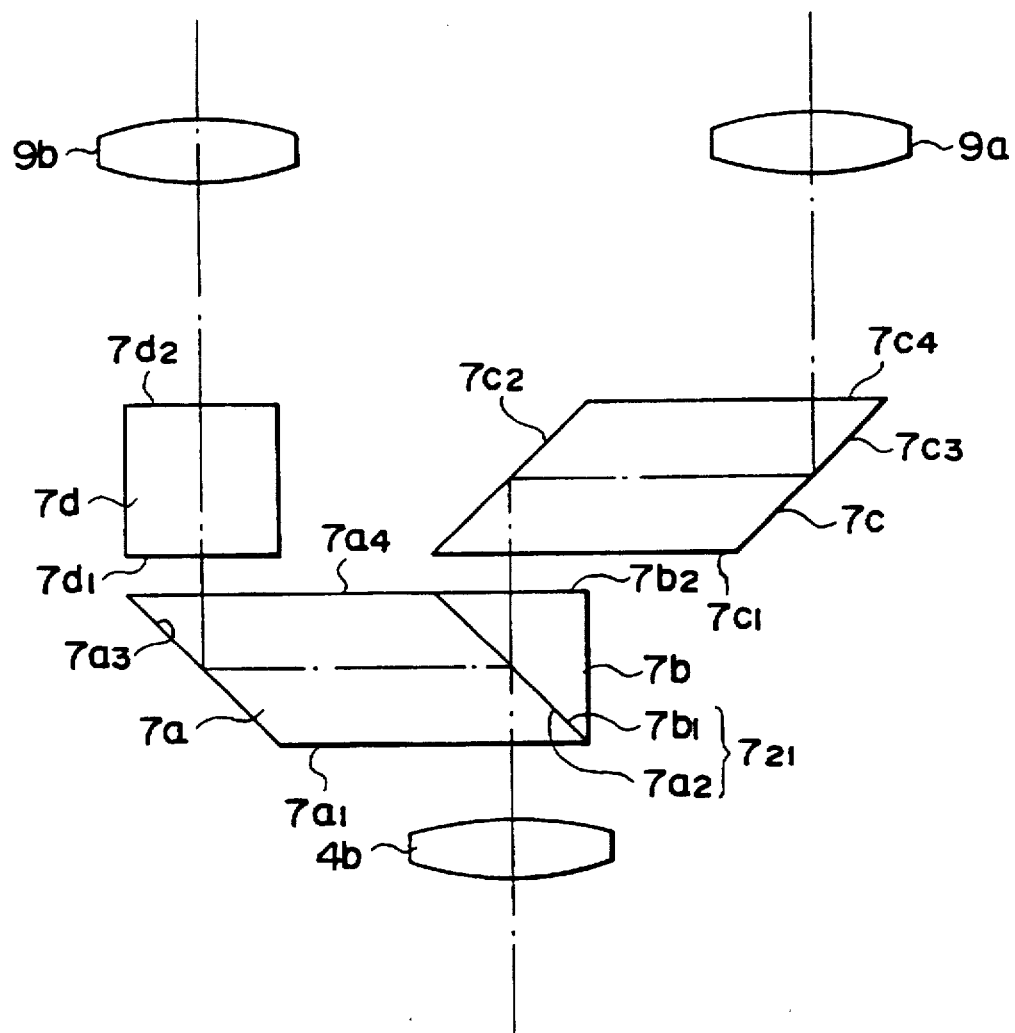
FIG. 4 is a drawing to show the structure of a separating prism for binocular observation in the barrel optical system set in the microscope apparatus of FIG. 1.

The beam of the measuring light emerging in the −Z-direction from the branching prism 3 travels through a first relay lens $4a$ inside the first straight barrel $22a$ and thereafter is reflected by a reflector 5 to reach the binocular lens barrel 23. As shown in FIG. 4, inside the binocular lens barrel 23, the beam emerging from the reflector 5 travels through a second relay lens $4b$ and thereafter enters first to fourth binocular separating prisms $7a$–$7d$ to be separated into two optical paths parallel to each other.

Namely, the first binocular separating prism $7a$ of a parallelepiped and the second binocular separating prism $7b$ of a triangular prism are integrally cemented to each other between their inclined planes. The third binocular separating prism $7c$ disposed behind the second binocular separating prism $7b$ is formed approximately similar to the first binocular separating prism $7a$, and the fourth binocular separating prism $7d$ disposed behind the first binocular separating prism $7a$ is formed in a rectangular prism shape.

A cemented surface $7_{21}$ between the second plane $7a_2$ of the first binocular separating prism $7a$ and the first plane $7b_1$ of the second binocular separating prism $7b$ of the triangular prism is formed as a half mirror. This half mirror has the reflectivity and transmittance both of about 50%. Thus, the measuring light emerging from the second relay lens $4b$ is transmitted by the first plane $7a_1$ of the first binocular separating prism $7a$ and thereafter is separated into two optical paths by the cemented surface $7_{21}$ between the first and second binocular separating prisms $7a$, $7b$.

The measuring light passing through the cemented surface $7_{21}$ between the first and second binocular separating prisms $7a$, $7b$ subsequently travels through the second plane $7b_2$ of the second binocular separating prism $7b$ and the first plane $7c_1$ of the third binocular separating prism $7c$, then is successively reflected by the second plane $7c_2$ and third plane $7c_3$ of the third binocular separating prism $7c$, and thereafter travels through the fourth plane $7c_4$ of the third binocular separating prism $7c$ to form a first optical image of the measured object.

On the other hand, the measuring light reflected by the cemented surface $7_{21}$ between the first and second binocular separating prisms $7a$, $7b$ is reflected by the third plane $7a_3$ of the first binocular separating prism $7a$, then travels through the fourth plane $7a_4$ of the first binocular separating prism $7a$, and thereafter travels successively through the first plane $7d_1$ and second plane $7d_2$ of the fourth binocular separating prism $7d$ to form a second optical image of the measured object.

Measuring light emerging from the first and second optical images of the measured object is incident to a first eyepiece lens $9a$ and a second eyepiece lens $9b$, respectively, arranged as an eyepiece optical system, so as to be enlarged and projected to the outside, thereby being observed by the naked eyes 10 of an observer. The first and second relay lenses $4a$, $4b$ are given in order to secure a necessary optical pathlength for positioning the first to fourth binocular separating prisms $7a$–$7d$ and to correct for chromatic aberration caused by the branching prism 13 and the first to fourth binocular separating prisms $7a$–$7d$.

As shown in FIG. 3, since the second plane $11_2$ of the transmitting prism 11 is formed in parallel with the first plane $3_1$ of the deflecting prism 3 inside the changeover mechanism 40, the measuring light passing through the first plane $11_1$ or the cemented surface $12_{21}$ passes through the second plane $11_2$ and thereafter emerges as kept in the +Z-direction along the optical axis of the objective optical system to reach the second straight barrel $22b$. Inside the second straight barrel $22b$ the measuring light emerging from the branching prism 13 is focused as a third optical image of the measuring object. The measuring light emerging from the third optical image of the measured object is enlarged and projected to the outside to be observed as a microscopical image taken by the image pickup device 60.

In the dual mode for simultaneous naked eye observation and image pickup observation as described above, the measuring light having the light quantity of about 20% is guided from the first straight barrel $22a$ to the binocular lens barrel 23 and the measuring light having the light quantity of about 80% is guided from the first straight barrel $22a$ to the second straight barrel $22b$. Accordingly, the microscopical image of sample 1 is observed based on the optical image of sample 1 enlarged and projected to the observer's naked eyes 10 and the optical image of sample 1 taken by the image pickup device 60.

As shown in FIG. 1, the swing arm mechanism 50 is set to rotate the binocular lens barrel 23 in the XY plane and about the fulcrum of the lower end of the binocular lens barrel 23 at the upper part of the first straight barrel $22a$, and variably sets an angle of depression in the optical-axis direction, of the binocular optical system 6 composed of the second relay lens $4b$, the first to fourth binocular separating prisms $7a$–$7d$, and the first and second eyepiece lenses $9a$, $9b$ and an angle of depression in the direction of the mirror surface, of the reflector 5 in correspondence to each other. Such a setup of the swing arm mechanism 50 is described in detail in U.S. Pat. No. 4,299,439 as cited above.

Namely, the reflector 5 and binocular optical system 6 are arranged so as to freely swing about the rotation axis extending in the Y-axis direction perpendicular to a plane including an incident point of the beam to the reflector 5 and made by the incident light beam and the reflected light beam, that is, perpendicular to the XZ plane. Here, letting an angle $\alpha_0$ to the horizontal plane be a reference value of the depression angle $\alpha$ of the binocular optical system 6 and an angle $\beta_0$ to the horizontal plane be a reference value of the depression angle $\beta$ of the reflector 5, the depression angle $\alpha$ of the binocular optical system 6 and the depression angle $\beta$ of the reflector 5 are controlled so as to satisfy the following equation: $\beta=\beta_0+(\alpha-\alpha_0)/2$. For that purpose, the swing arm mechanism 50 is arranged as capable of freely changing the depression angle $\alpha$ of the binocular optical system 6, i.e., an angle of inclination thereof.

As shown in FIG. 5, in the first special-purpose mode for only naked eye observation, the deflecting prism 14 is set by the changeover mechanism 40 in the optical path of the lens-barrel optical system between the first straight barrel 22a and the second straight barrel 22b. This deflecting prism 14 is formed substantially in the same structure as the deflecting prism 3 included in the branching prism 13.

Namely, a first plane $14_1$ and a third plane $14_3$ of the deflecting prism 14 are formed to be the same as the first plane $3_1$ and third plane $3_3$ of the deflecting prism 3. However, a second plane $14_2$ of the deflecting prism 14 is formed as a back side reflector, similarly as the third plane $14_3$ is.

In the first special-purpose mode for only naked eye observation, all the measuring light is thus guided from the first straight barrel 22a to the binocular lens barrel 23, so that no light is guided from the first straight barrel 22a to the second straight barrel 22b. Therefore, the microscopical image of the sample 1 is observed by the observer's naked eyes, based on only the optical images of sample 1 enlarged and projected thereto.

As shown in FIG. 6, in the second special-purpose mode for only image pickup observation, the plane-parallel optical element 15 is set as a plane-parallel glass by the changeover mechanism 40 in the optical path of the lens-barrel optical system between the first straight barrel 22a and the second straight barrel 22b. This plane-parallel optical element 15 has a first plane $15_1$ and a second plane $15_2$ arranged in parallel with each other and is formed in a rectangular parallelepiped shape. In the plane-parallel optical element 15 the first plane $15_1$ and second plane $15_2$ are arranged to be perpendicular to the optical axis of the objective optical system, that is, in parallel with the XY plane.

Here, the thickness and the refractive index of the plane-parallel optical element 15 are selected so as to keep the imaging position of the third optical image of sample 1 at the same position as in the dual mode for simultaneous naked eye observation and image pickup observation, before the image pickup device 60 and inside the second straight barrel 22b.

In the second special-purpose mode for only image pickup observation, all the measuring light is thus guided from the first straight barrel 22a to the second straight barrel 22b, but no light is guided from the first straight barrel 22a to the binocular lens barrel 23. Therefore, the microscopical image of sample 1 is observed, based on only the optical image of sample 1 taken by the image pickup device 60.

Since the present embodiment is arranged as described above in such an arrangement that in the dual mode and the first special-purpose mode, the light beam emerging from the first and second objective lenses 2a, 2b is deflected downward by the branching prism 13 or deflecting prism 14 and thereafter is guided to the binocular optical system 6 by the reflector 5, the eye level of observer can be set at a low level. Since the observer's eye level can be kept low by keeping the position of the reflector 5 low even with a wide clearance present between the first objective 2a and the second objective 2b, an intermediate lens barrel or the like can be readily added between the first objective 2a and the second objective 2b.

In addition, although the branching prism 13 and the deflecting prism 14 are formed to effect three reflections, the number of polished surfaces is at most three in total because the first plane $3_1$, $14_1$ serves as the incident plane, the reflecting plane, and the emergent plane. Thus, a cheap lens-barrel optical system can be attained because of the decreased number of polished surfaces.

Further, the present embodiment is arranged as capable of freely changing an angle of inclination of the binocular optical system 6 by the swing arm mechanism 50. Further, the observer can simultaneously observe the sample images through the binocular optical system 6 and the image pickup device 60 in the dual mode. Since the present embodiment is arranged to relay the image without forming an intermediate image on the way, the entire apparatus becomes compact.

It is noted that the present invention is not intended to be limited to the above various embodiments, but may have various modifications and arrangements.

For example, the above embodiment is arranged so that in the second special-purpose mode for only image pickup observation, the plane-parallel optical element 15 is set by the changeover mechanism 40 in the optical path of the lens-barrel optical system between the first straight barrel 22a and the second straight barrel 22b. However, as shown in FIG. 7, a relay lens 16 in place of the plane-parallel optical element 15 may be set by the changeover mechanism 40 in the optical path of the lens-barrel optical system between the first straight barrel 22a and the second straight barrel 22b. In this case, the relay lens 16 has at least one lens surface, so that it can correct for chromatic aberration caused by the first objective 2a and the second objective 2b.

The above embodiment is arranged so that the light source 70 and dichroic mirror 71 may compose a vertical illumination optical system. However, the illumination optical system may be formed as a transmission illumination optical system by placing the light source 70 below the stage 30 while an aperture is formed in the stage 30 or the stage 30 is made of an optically transparent material. In this case, the illumination light emitted from the light source 70 illuminates the sample 1 held on the stage 30 from the bottom, and transmitted light by the sample 1 is condensed as measuring light by the first objective 2a.

Since the lens-barrel optical system according to the present invention is arranged so that the light beam emerging from the objective optical system is deflected downward by the prism and is guided toward the eyepiece by the reflector, the observer's eye level can be set at a low level. Even if an intermediate lens barrel or the like is desired to be set between the lens-barrel optical system and the sample, the observer's eye level can be set sufficiently low. Further, since there exists no specific member to interfere with the optical paths above the reflecting surface of the prism for first reflecting the light beam from the objective lens, the simultaneous observation, for example naked eye observation and photographic observation, can be readily performed by using a half mirror instead of the reflecting surface. In addition, the angle of inclination of naked eye observation can be freely changed by the variable arrangement of the depression angle in the optical-axis direction, of the eyepiece optical system and the depression angle in the mirror-surface direction, of the reflector.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 106963/1995 filed on Apr. 6, 1995 is hereby incorporated by reference.

What is claimed is:

1. A lens-barrel optical system for guiding a beam emitted from an objective optical system to an eyepiece optical system as focusing the beam, comprising:

a deflecting prism having three internal reflecting surfaces arranged in a triangular prism, said deflecting prism successively reflecting a beam incident in a first direction parallel to an optical axis of said objective optical system by said three reflecting surfaces to let the beam travel in a substantially M-shaped optical path, thereby letting the beam emerge in a second direction opposite to said first direction; and a reflector for reflecting the beam emerging from said deflecting prism in said second direction to guide the beam to said eyepiece optical system, wherein due to the M-shaped optical path, said eyepiece optical system may be positioned at a lower level relative to said objective optical system.

2. The lens-barrel optical system according to claim 1, wherein said deflecting prism is comprised of a branching prism having a semitransparent surface of the reflecting surface that first reflects the beam incident from said objective optical system out of said three reflecting surfaces, said branching prism letting the beam incident in said first direction travel through said semitransparent surface and emerge still in said first direction and, on the other hand, reflecting the beam by said semitransparent surface and thereafter successively reflecting the beam by said two remaining reflecting surfaces so as to let the beam travel in the substantially M-shaped optical path, thereby letting the beam emerge in said second direction to guide the beam to said reflector.

3. The lens-barrel optical system according to claim 1, further comprising a swing arm mechanism for variably setting an angle of depression in a direction of an optical axis of said eyepiece optical system and an angle of depression in a direction of a surface of said reflector in correspondence to each other.

4. The lens-barrel optical system according to claim 1, further comprising a changeover mechanism for detachably setting said deflecting prism relative to an optical path along said first direction.

5. The lens-barrel optical system according to claim 4, further comprising a branching prism arranged as interchangeable with said deflecting prism by said changeover mechanism, wherein, when moved into the optical path along said first direction, said branching prism has three internal surfaces consisting of a semitransparent surface and two reflecting surfaces arranged in a triangular prism, for letting the beam incident in said first direction travel through said semitransparent surface, thereby letting the beam emerge still in said first direction and, on the other hand, reflecting the beam by said semitransparent surface and thereafter successively reflecting the beam by said two reflecting surfaces so as to let the beam travel in the substantially M-shaped optical path, thereby letting the beam emerge in said second direction to guide the beam to said reflector.

6. The lens-barrel optical system according to claim 4, further comprising a plane-parallel optical element arranged as interchangeable with said deflecting prism by said changeover mechanism, wherein, when moved into the optical path along said first direction, said plane-parallel optical element has two transparent surfaces set in parallel with each other, for letting the beam incident in said first direction successively travel through said two transparent surfaces, thereby letting the beam emerge still in said first direction.

7. The lens-barrel optical system according to claim 4, further comprising a relay lens arranged as interchangeable with said deflecting prism by said changeover mechanism, wherein, when moved into the optical path along said first direction, said relay lens has at least one lens surface, for refracting the beam incident in said first direction by said at least one refracting surface, thereby letting the beam emerge still in said first direction.

8. A microscope apparatus for enlarging and projecting an optical image of a measured object in an observable size, comprising:

a stage for holding said measured object;

an illumination optical system for emitting illumination light to said measured object; and a lens-barrel optical system for condensing and projecting measured light emerging from said measured object, wherein said lens-barrel optical system comprises:

an objective optical system for condensing the measured light emerging from said measured object to form an optical image of said measured object, a deflecting prism having three internal reflecting surfaces arranged in a triangular prism, said deflecting prism successively reflecting the measuring light incident in a first direction parallel to an optical axis of said objective optical system by said three reflecting surfaces so as to let the measuring light travel in a substantially M-shaped optical path, thereby letting the measuring light emerge in a second direction opposite to said first direction; and a reflector for reflection-deflecting the measuring light emerging from said deflecting prism in said second direction, and an eyepiece optical system for enlarging the image of the measuring light emerging from said reflector into an optical image of said measured object in an observable size, wherein due to the M-shaped optical path, said eyepiece optical system may be positioned at a lower level relative to said objective optical system.

9. The microscope apparatus according to claim 8, wherein said illumination optical system is comprised of a light source for generating the illumination light, and an optical branching filter for guiding the illumination light emitted from said light source to said objective optical system and guiding the measuring light emerging from said objective optical system to said deflecting prism.

10. The microscope apparatus according to claim 8, wherein said lens-barrel optical system further comprises a binocular separating prism for separating the measuring light emerging from said reflector into two beams parallel to each other and guiding the beams to said eyepiece optical system.

11. The microscope apparatus according to claim 8, further comprising a drive mechanism for three-dimensionally adjusting a relative positional relation between said stage and said lens-barrel optical system.

12. The microscope apparatus according to claim 8, wherein said deflecting prism is comprised of a branching prism having a semitransparent surface of the reflecting surface that first reflects the measuring light incident from said objective optical system out of said three reflecting surfaces, said branching prism letting the measuring light incident in said first direction travel through said semitransparent surface and emerge still in said first direction and, on the other hand, reflecting the measuring light by said semitransparent surface and thereafter successively reflecting the measuring light by said two remaining reflecting surfaces so as to let the measuring light travel in the substantially M-shaped optical path, thereby letting the measuring light emerge in said second direction to guide the measuring light to said reflector.

13. The microscope apparatus according to claim 12, further comprising an image pickup device for condensing the measuring light emerging in said first direction from said lens-barrel optical system and receiving the measuring light condensed.

14. The microscope apparatus according to claim 8, wherein said lens-barrel optical system further comprises a swing arm mechanism for variably setting an angle of depression in a direction of an optical axis of said eyepiece optical system and an angle of depression in a direction of a surface of said reflector in correspondence to each other.

15. The microscope apparatus according to claim 8, wherein said lens-barrel optical system further comprises a changeover mechanism for detachably setting said deflecting prism relative to an optical path along said first direction.

16. The microscope apparatus according to claim 15, further comprising an image pickup device for condensing the measuring light emerging in said first direction from said lens-barrel optical system and receiving the measuring light condensed.

17. The microscope apparatus according to claim 16, wherein said image pickup device is either a photographic camera for taking the optical image of said measured object as a still image or a video camera for taking the optical image of said measured object as a moving picture.

18. The microscope apparatus according to claim 15, wherein said lens-barrel optical system further comprises a branching prism arranged as interchangeable with said deflecting prism by said changeover mechanism, wherein, when moved into the optical path along said first direction, said branching prism has three internal surfaces consisting of a semitransparent surface and two reflecting surfaces arranged in a triangular prism, for letting the measuring light incident in said first direction travel through said semitransparent surface, thereby letting the measuring light emerge still in said first direction to guide the measuring light to said image pickup device and, on the other hand, reflecting the measuring light by said semitransparent surface and thereafter successively reflecting the measuring light by said two reflecting surfaces so as to let the measuring light travel in the substantially M-shaped optical path, thereby letting the measuring light emerge in said second direction to guide the measuring light to said reflector.

19. The microscope apparatus according to claim 15, wherein said lens-barrel optical system further comprises a plane-parallel optical element arranged as interchangeable with said deflecting prism by said changeover mechanism, wherein, when moved into the optical path along said first direction, said plane-parallel optical element has two transparent surfaces set in parallel with each other, for letting the measuring light incident in said first direction successively travel through said two transparent surfaces, thereby letting the measuring light emerge still in said first direction to guide the measuring light to said mage pickup device.

20. The microscope apparatus according to claim 15, wherein said lens-barrel optical system further comprises a relay lens arranged as interchangeable with said deflecting prism by said changeover mechanism, wherein, when moved into the optical path along said first direction, said relay lens has at least one lens surface, for refracting the measuring light incident in said first direction by said at least one refracting surface, thereby letting the measuring light emerge still in said first direction to guide the measuring light to said mage pickup device.

* * * * *